US011649357B2

(12) United States Patent
Wang et al.

(10) Patent No.: US 11,649,357 B2
(45) Date of Patent: May 16, 2023

(54) LASER PLATABLE THERMOPLASTIC COMPOSITIONS WITH GOOD FLAME RETARDANCY, HIGH HEAT PROPERTY AND GOOD DUCTILITY AND SHAPED ARTICLES MADE THEREFROM

(71) Applicant: SHPP Global Technologies B.V., Bergen op Zoom (NL)

(72) Inventors: Jian Wang, Shanghai (CN); Shijie Song, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 324 days.

(21) Appl. No.: 16/982,630

(22) PCT Filed: Mar. 18, 2019

(86) PCT No.: PCT/IB2019/052188
§ 371 (c)(1),
(2) Date: Sep. 21, 2020

(87) PCT Pub. No.: WO2019/180592
PCT Pub. Date: Sep. 26, 2019

(65) Prior Publication Data
US 2021/0024701 A1  Jan. 28, 2021

(30) Foreign Application Priority Data
Mar. 21, 2018  (EP) .................................... 18163058

(51) Int. Cl.
| | | |
|---|---|---|
| *C08L 83/12* | (2006.01) | |
| *C08K 3/013* | (2018.01) | |
| *C08G 77/46* | (2006.01) | |
| *C08G 77/00* | (2006.01) | |
| *C08K 3/22* | (2006.01) | |
| *C08K 3/30* | (2006.01) | |
| *C08K 5/00* | (2006.01) | |
| *C08L 71/12* | (2006.01) | |
| *C08K 5/521* | (2006.01) | |

(52) U.S. Cl.
CPC .............. *C08L 83/12* (2013.01); *C08G 77/46* (2013.01); *C08G 77/80* (2013.01); *C08K 3/013* (2018.01); *C08K 3/22* (2013.01); *C08K 3/30* (2013.01); *C08K 5/0066* (2013.01); *C08K 5/521* (2013.01); *C08L 71/12* (2013.01); *C08K 2003/222* (2013.01); *C08K 2003/2248* (2013.01); *C08K 2003/3036* (2013.01)

(58) Field of Classification Search
CPC .......... C08L 71/02; C08L 71/12; C08G 77/46
See application file for complete search history.

(56) References Cited

U.S. PATENT DOCUMENTS

| | | |
|---|---|---|
| 3,933,734 A | 1/1976 | Mark et al. |
| 4,806,297 A | 2/1989 | Brown et al. |
| 5,596,048 A | 1/1997 | Blohm et al. |
| 7,547,849 B2 | 6/2009 | Lee et al. |
| 8,492,464 B2 | 7/2013 | Li et al. |
| 2010/0069543 A1 | 3/2010 | Monden et al. |
| 2013/0142979 A1* | 6/2013 | Edwards ........... H01L 21/67336 428/36.92 |
| 2013/0289178 A1 | 10/2013 | Li et al. |
| 2014/0194561 A1 | 7/2014 | Ganguly et al. |
| 2016/0333481 A1 | 11/2016 | Gong et al. |
| 2016/0355679 A1* | 12/2016 | Aepli ...................... C08L 77/06 |
| 2021/0130585 A1* | 5/2021 | Wang ....................... C08K 9/12 |
| 2022/0135793 A1* | 5/2022 | Schrauwen ............ H05K 3/105 174/255 |

FOREIGN PATENT DOCUMENTS

| | | | |
|---|---|---|---|
| CN | 102066122 A | | 5/2011 |
| CN | 104937032 A | | 9/2015 |
| CN | 105230133 A | | 1/2016 |
| CN | 105492214 A | | 4/2016 |
| CN | 103540151 B | | 5/2016 |
| CN | 106133060 A | | 11/2016 |
| CN | 112662159 A | * | 4/2021 |
| EP | 2098562 A1 | | 9/2009 |
| EP | 2103654 A1 | | 9/2009 |
| EP | 2632734 B1 | | 3/2016 |
| JP | 2018-024812 A | | 2/2018 |
| KR | 10-2014-0087912 A | | 7/2014 |
| KR | 10-2016-0078615 A | | 7/2016 |
| KR | 10-2017-0106493 A | | 9/2017 |
| WO | WO 2009/141799 A1 | | 11/2009 |
| WO | WO 2014/008669 A1 | | 1/2014 |
| WO | WO 2014/096153 A1 | | 6/2014 |
| WO | WO 2014/162254 A1 | | 10/2014 |
| WO | WO 2015/197157 A1 | | 12/2015 |
| WO | WO 2017/102930 A1 | | 6/2017 |

OTHER PUBLICATIONS

"Effect of Impact Modifiers on Flow Properties of Compounds" published by Entec Polymers available at https://s3.amazonaws.com/entecpolymers.com/v3/uploads/content/Effect-of-Impact-Modifiers-on-Flow-Properties-of-Compounds-RGB.pdf (no date).*
European Patent Application No. 18163058.3; Extended Search Report; dated Oct. 10, 2018; 11 pages.
International Patent Application No. PCT/IB2019/052188; Int'l Written Opinion and Search Report; dated May 13, 2019; 13 pages.

(Continued)

*Primary Examiner* — Marc S Zimmer
(74) *Attorney, Agent, or Firm* — Quicker Law, LLC

(57) ABSTRACT

A thermoplastic composition includes a polyarylene ether component, a flame retardant additive, an impact modifier, and a laser direct structuring additive. The laser platable thermoplastic composition is capable of being plated after being activated using a laser, exhibits a plating index of greater than 0.8 when tested using X-ray fluorescence, and exhibits a heat deflection temperature of greater than 150° C. at 0.45 MPa/3.2 mm when tested in accordance with ASTM D648. In further aspects, the thermoplastic composition may further comprise a laser direct structuring additive synergist comprising a polysiloxane, a polysilane, or a silane.

13 Claims, No Drawings

(56) References Cited

OTHER PUBLICATIONS

International Patent Application No. PCT/IB2019/052188; Int'l Preliminary Report on Patentability; dated Oct. 1, 2020; 11 pages.

* cited by examiner

LASER PLATABLE THERMOPLASTIC COMPOSITIONS WITH GOOD FLAME RETARDANCY, HIGH HEAT PROPERTY AND GOOD DUCTILITY AND SHAPED ARTICLES MADE THEREFROM

CROSS-REFERENCE TO RELATED APPLICATION

This application is the National Stage of International Application No. PCT/IB2019/052188 filed Mar. 18, 2019, which claims priority to and the benefit of European Application No. 18163058.3 filed Mar. 21, 2018, the disclosures of which are incorporated herein by this reference in their entireties.

FIELD OF THE DISCLOSURE

The disclosure relates to a laser platable thermoplastic compositions exhibiting certain mechanical and thermal properties.

BACKGROUND OF THE DISCLOSURE

Laser direct structuring (LDS) is a type of Molded Interconnect Device (MID) technology in which an injection-molded thermoplastic part is typically integrated with electronic circuit traces. LDS has been used to provide conductive path structures on non-conductive material surfaces and has been widely used in electronic applications such as antennas or circuits. LDS technology has allowed for aggressive space reduction in this area of manufacturing, as well as ultra-fine precision and high reliability. Compared to more conventional methods, such as hot stamping and 2-shot molding, LDS may provide advantages in design capability, cycle time and cost efficiency, miniaturization, diversification and functionality of the devices.

Existing LDS resins based on polycarbonate and polyamide, however, exhibit poorer performance with respect to certain properties. US Pub. Pat. No. 2013/0289178 describes flame retardant laser direct structuring materials comprising from 15 to 85% by weight of a thermoplastic resin, wherein the thermoplastic resin comprises a poly(arylene ether), a poly(arylene ether)/polystyrene blend, or a combination comprising at least one of the foregoing resins; b) from 0.1 to 30% by weight of a laser direct structuring additive; and c) 20% or less by weight of a flame retardant. The compositions achieve a UL94 V0 rating at a thickness of 1.6 mm (±10%).

These and other shortcomings are addressed by aspects of the present disclosure.

SUMMARY

Aspects of the disclosure relate to a thermoplastic composition including a component polyarylene ether component, a flame retardant additive, an impact modifier, and a laser direct structuring additive. The laser platable thermoplastic composition is capable of being plated after being activated using a laser, exhibits a plating index of greater than 0.8 when tested using X-ray fluorescence, and exhibits a heat deflection temperature of greater than 150 degrees Celsius (° C.) at 0.45 megapascals (MPa)/3.2 millimeter (mm) when tested in accordance with ASTM D648. In further aspects, the thermoplastic composition may further include a laser direct structuring additive synergist.

Further aspects of the disclosure relate to methods for making a thermoplastic composition and/or thermoplastic article, including: forming a blend by mixing a polymeric base resin, a glass fiber component, and a laser direct structuring additive; and injection molding, extruding, rotational molding, blow molding or thermoforming the blend to form the thermoplastic composition and/or article. The laser direct structuring additive may include copper chromite black or a copper hydroxide phosphate.

DETAILED DESCRIPTION

Generally in LDS technology, a thermoplastic material is doped with a metal-plastic additive, and a laser may be used to form a micro-circuit trace on the thermoplastic material by activating the metal-plastic additive. LDS technology has achieved great success in the manufacture of antenna. However, for some applications, such as, for example, certain cooking appliances, current LDS solutions primarily based on polycarbonate (PC) and polyamine (PA) fail to meet certain mechanical and physical performance. In general, LDS products with good flame retardance (FR), high heat property, and good ductility were needed in these new areas. For example, PC-based LDS materials may exhibit relatively low thermal performance (see, e.g., U.S. Pat. No. 8,492,464); and, PA-based LDS products may often be brittle (see, e.g., WO2014096153A1). Thus, balancing the LDS, FR, heat, and mechanical performance in a single-thermoplastic composition may be challenging. The development of LDS products with good FR, high heat, and good ductility could extend the useful applications of these products. The compositions of the present disclosure may provide laser platable thermoplastic compositions exhibiting good flame retardancy, good mechanical performance (particularly, ductility) and good thermal stability.

In one aspect, the present disclosure relates to a laser platable thermoplastic composition comprising a polyarylene ether component, a laser direct structuring additive, a flame retardant additive, and an impact modifier. The laser platable thermoplastic composition may be capable of being plated after being activated using a laser. The laser platable thermoplastic composition may exhibit a plating index of greater than 0.8 when measured using X-ray fluorescence. The laser platable thermoplastic composition may exhibit a heat deflection temperature of greater than 150 degrees Celsius (° C.) at 0.45 megapascals (MPa)/3.2 millimeter (mm) when tested in accordance with ASTM D 648.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Thus, in various aspects, the present disclosure pertains to a thermoplastic composition including a polymeric base resin such as a polyarylene ether, a laser direct structuring additive, a flame retardant additive, and an impact modifier. The thermoplastic composition may be capable of being plated after laser activation. The laser platable thermoplastic composition may exhibit a plating index of greater than 0.8 when measured using X-ray fluorescence and may exhibit a heat deflection temperature of greater than 150° C. at 0.45 MPa/3.2 mm when tested in accordance with ASTM D648. In further aspects, the laser platable composition exhibits a desirable ductility for processing, that is, a Notched Izod value of up to 378 joules per meter (J/m) at 23° C. when tested in accordance with ASTM D256.

Polymer Component

In various aspects, the disclosed thermoplastic compositions include a polymeric base resin. The polymeric base resin may comprise a polyarylene ether component.

Suitable poly(arylene ether)s include those comprising repeating structural units having the formula

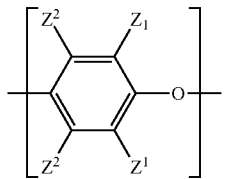

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z_1$ may be methyl and Z2 may be hydrogen as in polyphenyl oxide.

The poly(arylene ether) may be in the form of a homopolymer, a copolymer, a graft copolymer, an ionomer, or a block copolymer, as well as combinations comprising at least one of the foregoing. In some examples, the poly (arylene ether) component comprises a poly(phenyl ether) or polyphenylene ether, designated PPE or PPO.

The poly(arylene ether) may have a number average molecular weight of 3,000 to 40,000 atomic mass units (amu) and a weight average molecular weight of 5,000 to 80,000 amu, as determined by gel permeation chromatography. The poly(arylene ether) may have an intrinsic viscosity of 0.10 to 0.60 deciliters per gram (dl/g), or, more specifically, 0.29 to 0.48 dl/g, as measured in chloroform at 25° C. It is possible to utilize a combination of high intrinsic viscosity poly(arylene ether) and a low intrinsic viscosity poly(arylene ether). Determining an exact ratio, when two intrinsic viscosities are used, will depend somewhat on the exact intrinsic viscosities of the poly(arylene ether) used and the ultimate physical properties that are selected.

Suitable polyphenylene ether polymers for the present disclosure may include, but are not limited to, poly(2,6-dimethyl-1,4-phenylene)ether; poly(2,3,6-trimethyl-1,4-phenylene) ether; poly(2,6-diethyl-1,4-phenylene)ether; poly(2-methyl-6-propyl-1,4-phenylene) ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene) ether; poly(2-ethyl-6-stearyloxy-1,4-phenylene)ether; poly (2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly (2-chloro-1,4-phenylene) ether; poly(2,6-dibromo-1,4-phenylene)ether; poly(3-bromo-2,6-dimethyl-1,4-phenylene)ether, copolymers thereof and mixtures thereof, and the like. In select aspects, polyphenylene ether polymers for use in the compositions of the present disclosure include poly(2,6-dimethyl-1,4-phenylene)ether, poly(2,3,6-trimethyl-1,4-phenylene)ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

In yet further examples, the poly(arylene ether) component may comprise a poly(arylene ether) polysiloxane block copolymer. In some aspects, the poly(arylene ether)-polysiloxane block copolymer may comprise a poly(arylene ether) block and a polysiloxane block. The composition may poly(arylene ether)-polysiloxane block copolymer reaction product comprising a poly(arylene ether) homopolymer, and a poly(arylene ether)-polysiloxane block copolymer comprising a poly(arylene ether) block, and a polysiloxane block comprising, on average, about 20 to about 80 siloxane repeating units; wherein the poly(arylene ether) block comprises arylene ether repeating units. The poly(arylene ether) block may be a residue of the polymerization of the monohydric phenol. In some examples, the poly(arylene ether) block comprises arylene ether repeating units having the structure (as indicated above)

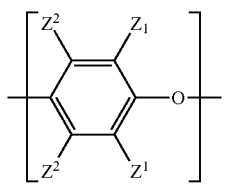

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. In certain examples, the poly(arylene ether) block comprises 2,6-dimethyl-1,4-phenylene ether repeating units, that is, repeating units having the structure

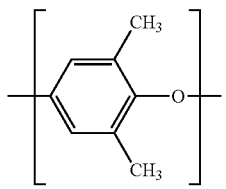

2,3,6-trimethyl-1,4-phenylene ether repeating units, or a combination thereof.

The polysiloxane block may be a residue of the hydroxyaryl-terminated polysiloxane. In some aspects, the polysiloxane block comprises repeating units having the structure

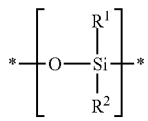

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure

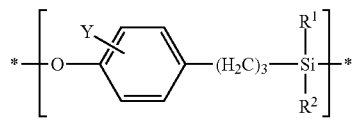

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some examples, the polysiloxane repeating units comprise dimethylsiloxane (—Si(CH$_3$)$_2$O—) units. In further examples, the polysiloxane block has the structure

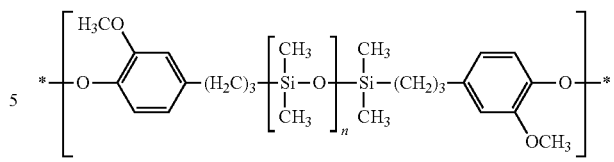

wherein n is 20 to 80.

The hydroxyaryl-terminated polysiloxane may comprise at least one hydroxyaryl terminal group. In some aspects, the hydroxyaryl-terminated polysiloxane has a single hydroxyaryl terminal group, in which case a poly(arylene ether)-polysiloxane di-block copolymer is formed. In other aspects, the hydroxyaryl-terminated polysiloxane has two hydroxyaryl terminal groups, in which case in which case poly(arylene ether)-polysiloxane di-block and/or tri-block copolymers are formed. It is also possible for the hydroxyaryl-terminated polysiloxane to have a branched structure that allows three or more hydroxyaryl terminal groups and the formation of corresponding branched copolymers.

As noted above, the polysiloxane block may, on average, 35 to 80 siloxane repeating units. Within this range, the number of siloxane repeating units can be 35 to 60, more specifically 40 to 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. In one example, the PPO-siloxane block copolymer is a D45 copolymer indicating that the polysiloxane has approximately 45 siloxane repeating units.

When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

In certain examples, the presence of a polysiloxane copolymer in the disclosed compositions may improve certain physical properties. A silicon component such as a polysiloxane copolymer may synergistically improve the plating performance of the disclosed compositions as disclosed herein. That is, the polysiloxane copolymer and polyarylene ether resin may provide improved plating performance with the laser direct structuring additive.

The thermoplastic composition may comprise from 1 to 8 weight percent (wt. %) siloxane repeating units and 12 to 99 wt. % arylene ether repeating units, based on the total weight of the thermoplastic composition. Within these ranges, the wt. % of siloxane repeating units can be 2 to 7 wt. %, specifically 3 to 6 wt. %, more specifically 4 to 5 wt. %; and the wt. % arylene ether repeating units can be 50 to 98 wt. %, specifically 70 to 97 wt. %, more specifically 90 to 96 wt. %.

In a further aspect, the polymeric base resin can have a weight average molecular weight from about 30,000 to about 150,000 Daltons or atomic mass units. The thermoplastic composition may comprise a poly(arylene ether) having a weight average molecular weight of 3,000 to 40,000 amu and a weight average molecular weight of 5,000 to 80,000 amu, as determined by gel permeation chromatography.

In some aspects, the polymeric base resin can be present in the thermoplastic composition in an amount from about 20 wt. % to about 90 wt. %. In other aspects, the polymeric base resin can be present in an amount from about 30 wt. % to about 80 wt. %, or from about 40 wt. % to about 70 wt. %, or from about 50 wt. % to about 70 wt. %, or from about 55 wt. % to about 65 wt. %. The thermoplastic composition may comprise from about 50 wt. % to about 90 wt. % of the poly(arylene ether), based on the total weight of the composition. The polyarylene ether may be present in any amount between the endpoints. For example, the composition may comprise about 70 wt. % of a polyarylene ether.

In some aspects, the polymeric base resin can be present in the thermoplastic composition in an amount from about 20 wt. % to about 90 wt. %. In other aspects, the polymeric base resin can be present in an amount from about 30 wt. % to about 80 wt. %, or from about 40 wt. % to about 70 wt. %, or from about 50 wt. % to about 70 wt. %, or from about 55 wt. % to about 65 wt. %.

Impact Modifier

According to various aspects of the present disclosure, the laser platable thermoplastic composition may comprise an impact modifier. A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). In certain aspects, the impact modifier may comprises a styrene-based copolymer selected from the group consisting of styrene ethylene butylene styrene copolymer (SEBS), styrene butadiene styrene (SBS), styrene ethylene propylene styrene (SEPS) and combinations thereof.

In one aspect, the impact modifier comprises SEBS. SEBS may be a linear tri-block copolymer-based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

The impact modifier may have a certain viscosity. For example, the impact modifier may have a viscosity of less than 3 grams (g) per 10 minutes (min) at 230° C. per 5 kilograms (kg), when tested in accordance with ASTM D1238. In a specific example, the impact modifier may comprise SEBS having a viscosity of fewer than 3 g/10 min at 230° C./5 kg when tested in accordance with ASTM D1238.

The impact modifier may be present in the laser platable thermoplastic composition in an amount of from 0.01 wt. % to about 20 wt. %, based on the total weight of the composition. It will be recognized that combinations of impact modifiers may be used. In some aspects, the impact modifier may be present in an amount from greater than about 0.01 wt. % to about 10 wt. %. In further aspects, the impact modifier is present in an amount from about 0.01 wt. % to about 18 wt. %, from about 0.01 wt. % to about 15 wt. %, from about 0.01 wt. % to about 12 wt. %, from about 0.01 wt. % to about 8 wt. %, or from about 0.01 wt. % to about 7 wt. %, or from about 0.01 wt. % to about 6 wt. %, or from about 2 wt. % to about 8 wt. %, or from about 3 wt. % to about 7 wt. %.

Laser Direct Structuring Additive

Aspects of the thermoplastic composition include a laser direct structuring (LDS) additive. In certain aspects, the LDS additive includes copper chromite black, copper hydroxide phosphate, tin-antimony cassiterite grey or a combination thereof. An exemplary copper chromite black LDS additive is Black 1G, available from The Shepherd Color Company. Exemplary copper hydroxide phosphates are Iriotec™ 8840, available from Merck and Fabulase™ 364 available from Budenheim. An exemplary tin-antimony cassiterite grey is S-5000, available from Ferro.

In some aspects, the LDS additive may be present in the thermoplastic composition in an amount of from about 0.01 wt. % to about 20 wt. %. In further aspects, the LDS additive may be present in the thermoplastic composition in an amount of from about 0.5 wt. % to about 15 wt. %, or from about 1 wt. % to about 12 wt. %, or from about 1 wt. % to about 10 wt. %, or from about 2 wt. % to about 10 wt. %, or from about 2 wt. % to about 8 wt. %, or from about 3 wt. % to about 6 wt. %.

In some aspects, the laser platable thermoplastic composition may include a laser direct structuring synergist. In various examples fillers may serve as these synergists. The synergist may facilitate an improvement in the plating index properties when added to the laser platable composition over a comparative composition that contains all of the same ingredients in the same quantities except for the synergist. Examples of mineral fillers that may serve as synergists are mica, talc, calcium carbonate, dolomite, wollastonite, barium sulfate, silica, kaolin, feldspar, barytes, or the like, or a combination including at least one of the foregoing mineral fillers. Other LDS synergists may include polymers such as polysiloxane. In one example, the synergist may comprise a mineral filler such as clay. The mineral filler may have an average particle size of about 0.1 to about 20 micrometers (μm), specifically about 0.5 to about 10 μm, and more specifically about 1 to about 3 μm.

The synergist may comprise a siloxane. As provided herein, the presence of silicon in the disclosed compositions may improve certain physical properties. A silicon component such as a siloxane laser direct structuring additive synergist may contribute to improving the plating performance of the compositions as disclosed herein. As an example, the synergist may comprise a polysiloxane, a silane, a polysilane, or a combination thereof. In one example, the LDS synergist may comprise a polysiloxane mixture. Certain examples may comprise a combination of dimethyl/diphenylpolysiloxane, specifically a mixture of 60-70% hydroxyl-terminated siloxanes and silicones and 30-40% silicone resin.

The LDS synergist may be present in an amount of from about 0.01 wt. % to about 10 wt. %, from about 0.01 wt. % to about 5 wt. %, or from 0.01 wt. % to about 3 wt. %, or from about 0.01 wt. % to 2 wt. %. In an example, the LDS synergist is present in an amount of about 1 wt. % based on the total weight of the laser platable composition. Synergistic performance may be achieved by the presence of polysiloxane copolymer of the polymer base resin. For example, a polyarylene ether siloxane copolymer having a 5±0.5% by weight siloxane content may provide a synergistic effect on the plating performance such that the present siloxane may perform as the LDS synergist.

Plating index may be determined by a two-step process of laser etching and copper chemical deposition for 45 min according to the "LPKF Method" established by LPKF Laser & Electronics. In the first step, molded plaques of the materials to be evaluated (e.g. the thermoplastic composition) are laser etched/structured with the LPKF pattern, in which the laser variables are power, frequency and speed. Following this step, the laser structured plaque and one reference stick (material: Pocan DP 7102) are placed in the copper bath until the reference stick has a copper thickness of nearly 5 μm. The plaque and reference stick are then removed, rinsed and dried, and the copper thicknesses for the reference stick are measured twice on each side by an X-ray fluorescence (XRF) method (in accordance with ASTM B568 (2014)) and averaged over all four points. This is noted as $X_{ref}$. Then, two points are measured for each parameter field and averaged for each field. Plating index can then be calculated according to the formula:

$$\text{Plating index} = \frac{\text{Average copper thickness for one parameter field}}{\text{Average copper thickness for reference stick } X_{ref}}$$

In some aspects, the thermoplastic composition has a plating index of at least about 0.8. It is believed that the LDS additive contributes to the thermoplastic composition having an improved plating index as compared to a thermoplastic composition without an LDS additive. An LDS synergist may further increase plating performance.

Flame Retardant Additive

Suitable flame retardants include, but are not limited to, halogenated flame retardants, like tetrabromo bisphenol A oligomers such as BC58 and BC52, brominated polystyrene or poly(dibromo-styrene), brominated epoxies, decabromodiphenyleneoxide, pentabrombenzyl acrylate monomer, pentabromobenzyl acrylate polymer, ethylene-bis(tetrabromophthalimide, bis(pentabromobenzyl)ethane, metal hydroxides like $Mg(OH)_2$ and $Al(OH)_3$, melamine cyanurate, phosphor-based flame retardant systems like red phosphorus, melamine polyphosphate, phosphate esters, metal phosphinates, ammonium polyphosphates, expandable graphites, sodium or potassium perfluorobutane sulfate, sodium or potassium perfluorooctane sulfate, sodium or potassium diphenylsulfone sulfonate and sodium- or potassium-2,4,6-trichlorobenzoate and N-(p-tolylsulfonyl)-p-toluenesulfimide potassium salt, N—(N'-benzylaminocarbonyl) sulfanylimide potassium salt, or a combination containing at least one of the foregoing. Flame retardants are generally used in amounts of about 1.0 wt. % to about 40 wt. % of the resin composite, but could be used in other amounts.

Various types of flame retardants can be utilized as additives. In one aspect, the flame retardant additives include, for example, flame retardant salts such as alkali metal salts of perfluorinated C1-C16 alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain aspects, the flame retardant does not contain bromine or chlorine.

The flame retardant additives may include organic compounds that include phosphorus, bromine, and/or chlorine. In certain aspects, the flame retardant is not a bromine- or chlorine-containing composition. Non-brominated and non-chlorinated phosphorus-containing flame retardants can include, for example, organic phosphates and organic compounds containing phosphorus-nitrogen bonds. Exemplary di- or polyfunctional aromatic phosphorus-containing compounds include resorcinol tetraphenyl diphosphate (RDP), the bis(diphenyl) phosphate of hydroquinone and the bis (diphenyl) phosphate of bisphenol-A, respectively, their oligomeric and polymeric counterparts, and the like. Other exemplary phosphorus-containing flame retardant additives include phosphonitrilic chloride, phosphorus ester amides, phosphoric acid amides, phosphonic acid amides, phosphinic acid amides, tris(aziridinyl) phosphine oxide, polyorganophosphazenes, and polyorganophosphonates.

Some suitable polymeric or oligomeric flame retardants include: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenypethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2-bis-(3-bromo-4-hydroxyphenyl)-propane. Other flame retardants include: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

The flame retardant optionally is a non-halogen-based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by this reference in their entireties.

Another useful class of flame retardants is the class of cyclic siloxanes having the general formula [(R)2SiO]y wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

In some aspects, the polymer composition may include a synergist. In various examples fillers may serve as flame retardant synergists. The synergist facilitates an improvement in the flame retardant properties when added to the flame retardant composition over a comparative composition that contains all of the same ingredients in the same quantities except for the synergist. Examples of mineral fillers that may serve as synergists are mica, talc, calcium carbonate, dolomite, wollastonite, barium sulfate, silica, kaolin, feldspar, barytes, or the like, or a combination including at least one of the foregoing mineral fillers. The mineral filler may have an average particle size of about 0.1 to about 20 μm, specifically about 0.5 to about 10 μm, and more specifically about 1 to about 3 μm. Metal synergists, e.g., antimony oxide, can also be used with the flame retardant.

Optional Composition Additives

In addition to the foregoing components, the disclosed thermoplastic compositions can optionally include a balance amount of one or more additive materials ordinarily incorporated in thermoplastic compositions of this type, with the proviso that the additives are selected so as to not significantly adversely affect the desired properties of the composition. Combinations of additives can be used. Such additives can be mixed at a suitable time during the mixing of the components for forming the composition. Exemplary and non-limiting examples of additive materials that can be present in the disclosed thermoplastic compositions include one or more of a reinforcing filler, enhancer, acid scavenger, anti-drip agent, antioxidant, antistatic agent, chain extender, colorant (e.g., pigment and/or dye), de-molding agent, flow promoter, flow modifier, lubricant, mold release agent, plasticizer, quenching agent, flame retardant (including for example a thermal stabilizer, a hydrolytic stabilizer, or a light stabilizer), UV absorbing additive, UV reflecting additive and UV stabilizer.

In one aspect, the disclosed thermoplastic compositions may include a glass fiber component. In a further aspect, the glass fiber included in the glass fiber component is selected from E-glass, S-glass, AR-glass, T-glass, D-glass and R-glass. In a still further aspect, the glass fiber is selected from E-glass, S-glass, and combinations thereof. In a still further aspect, the glass fiber is one or more S-glass materials. High-strength glass is generally known as S-type glass in the United States, R-glass in Europe and T-glass in Japan. S-glass was originally developed for military applications in the 1960s, and a lower cost version, S-2 glass, was later developed for commercial applications. High-strength glass has appreciably higher amounts of silica oxide, aluminum oxide and magnesium oxide than E-glass. S-2 glass is approximately 40-70% stronger than E-glass. The glass fibers can be made by standard processes, e.g., by steam or air blowing, flame blowing, and mechanical pulling. Exemplary glass fibers for thermoplastic compositions of the present disclosure may be made by mechanical pulling.

The glass fibers may be sized or unsized. Sized glass fibers are coated on their surfaces with a sizing composition selected for compatibility with the polymeric base resin. The sizing composition facilitates wet-out and wet-through of the polymeric base resin upon the fiber strands and assists in attaining desired physical properties in the thermoplastic composition.

In various further aspects, the glass fiber is sized with a coating agent. In a further aspect, the coating agent is present in an amount from about 0.1 wt. % to about 5 wt. % based on the weight of the glass fibers. In a still further aspect, the coating agent is present in an amount from about 0.1 wt. % to about 2 wt. % based on the weight of the glass fibers.

In preparing the glass fibers, a number of filaments can be formed simultaneously, sized with the coating agent and then bundled into what is called a strand. Alternatively, the strand itself may be first formed of filaments and then sized. The amount of sizing employed is generally that amount which is sufficient to bind the glass filaments into a continuous strand and ranges from about 0.1 to about 5 wt. %, about 0.1 to 2 wt. % based on the weight of the glass fibers. Generally, this may be about 1.0 wt. % based on the weight of the glass filament.

In a further aspect, the glass fiber can be continuous or chopped. In a still further aspect, the glass fiber is continuous. In yet a further aspect, the glass fiber is chopped. Glass fibers in the form of chopped strands may have a length of about 0.3 millimeter (mm) to about 10 centimeters (cm), specifically about 0.5 mm to about 5 cm, and more specifically about 1.0 mm to about 2.5 cm. In various further aspects, the glass fiber has a length from about 0.2 mm to about 20 mm. In a yet further aspect, the glass fiber has a length from about 0.2 mm to about 10 mm. In an even further aspect, the glass fiber has a length from about 0.7 mm to about 7 mm. In this area, where a thermoplastic resin is reinforced with glass fibers in a composite form, fibers having a length of about 0.4 mm are generally referred to as long fibers, and shorter ones are referred to as short fibers. In a still further aspect, the glass fiber can have a length of 1 mm or longer. In yet a further aspect, the glass fiber can have a length of 2 mm or longer.

In various further aspects, the glass fiber has a round (or circular), flat, or irregular cross-section. Thus, use of non-round fiber cross sections is possible. In a still further aspect, the glass fiber has a circular cross-section. In yet further aspect, the diameter of the glass fiber is from about 1 to about 15 μm. In an even further aspect, the diameter of the glass fiber is from about 4 to about 10 μm. In a still further aspect, the diameter of the glass fiber is from about 1 to about 10 μm. In a still further aspect, the glass fiber has a diameter from about 7 μm to about 10 μm.

In some aspects, the glass fiber component is present in an amount from about greater than about 0 wt. % to about 60 wt. %. In further aspects, the glass fiber component is present in an amount from about 10 wt. % to about 60 wt. %, or from about 20 wt. % to about 60 wt. %, or from about 20 wt. % to about 50 wt. %, or from about 20 wt. % to about 40 wt. %.

One purely exemplary glass fiber suitable for use in the glass fiber component in an aspect of the disclosure is an E-glass fiber ECS303H, available from Chongqing Polycomp International Corp.

In a further aspect, the disclosed thermoplastic compositions can further include an antioxidant or "stabilizer." Numerous stabilizers are known and may be used; in one aspect the stabilizer is a hindered phenol, such as IRGANOX® 1010, available from BASF. In some aspects, the stabilizer may be present in an amount from greater than about 0 wt. % to about 5 wt. %. In further aspects, the stabilizer is present in an amount from about 0.01 wt. % to about 3 wt. %, or from about 0.01 wt. % to about 2 wt. %, or from about 0.01 wt. % to about 1 wt. %, or from about 0.01 wt. % to about 0.05 wt. %, or from about 0.01 wt. % to about 0.02 wt. %.

In certain aspects the composition may include an enhancer, which may improve the NMT bonding strength and/or the melt strength of the composition. Suitable enhancers may include polymeric or non-polymeric materials. Exemplary, but by no means limiting enhancers include polyethylene terephthalate, polyester-polyether copolymer (e.g., one or more of DuPont's Hytrel™ polyester elastomers), high molecular weight polyacrylates (e.g., poly(methyl methacrylate) (PMMA), poly(methacrylate) (PMA), and poly(hydroxyethyl methacrylate)), fluoropolymers, and combinations thereof. In certain aspects, the enhancer is present in an amount of from more than 0 to about 5 wt. %. In other aspects, the enhancer is present in an amount of from more than 0 to about 4 wt. %, or from more than 0 to about 3 wt. %, or from about 1 wt. % to about 4 wt. %, or from about 2 wt. % to about 3 wt. %.

Methods of Manufacture

The thermoplastic compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some aspects the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, the polymeric base resin, the glass fiber component, the laser direct structuring additive, and/or other optional components are first blended in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Articles of Manufacture and Properties

In one aspect, the present disclosure pertains to shaped, formed, or molded articles comprising the thermoplastic compositions. The thermoplastic compositions can be molded into useful shaped articles by a variety of means such as injection molding, extrusion, rotational molding, blow molding and thermoforming to form articles and structural components of, for example, personal or commercial consumer electronics, including but not limited to cellular telephones, tablet computers, personal computers, notebook and portable computers, and other such equipment, medical applications, RFID applications, and automotive applications. In a further aspect, the article is extrusion molded. In a still further aspect, the article is injection molded.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices.

In certain aspects, a laser platable article may be formed. Formation of the article may comprise molding an article from the laser platable composition disclosed herein. The article may then be exposed to a laser to form an activated area and a metal layer may be plated onto the activated area.

Laser platable thermoplastic compositions with good flame retardancy, high heat property, and good ductility have been developed based on the building blocks of PPO, SEBS, phosphorous FR additives, and laser-activatable metal compounds. Polysiloxane and inorganic fillers were used in the formulations and improved plating performance of the compositions. As provided herein, disclosed thermoplastic compositions may be useful in applications featuring metal laser plating and requiring certain physical and mechanical properties such as high heat and ductility. More specifically, the disclosed thermoplastic compositions may exhibit higher plating performance (e.g., a plating index greater than 0.8 when tested using X-ray fluorescence, good flame retardance (e.g., a flame rating up to V0 1.0 mm according to UL94), a high heat performance (e.g., heat deflection temperature higher than 150° C. at 0.45 MPa according to ASTM D648), and good ductility (e.g., a notched Izod value of up to 378 J/m at 23° C. according to ASTM D256). A substantially similar thermoplastic composition including a polyarylene ether (and/or polyarylene ether siloxane copolymer) with a higher viscosity impact modifier may not exhibit as high of a plating index.

The advantageous characteristics of the polymer compositions disclosed herein may make them appropriate for an array of uses. The article may be appropriate as a computer and business machine housing such as a housing for laptop personal computers, monitors, robotics, a hand held electronic device housing (such as a housing or flash holder for smart phones, tablets, music devices), electrical connectors, LED heat sink, and components of lighting fixtures, wearables, ornaments, home appliances, and the like. In a particular example, the polymer composition may be useful in a mobile device, such as the housing for a mobile device or as a polymer forming the antenna. In a further example, the thermoplastic composition may be useful in cooking appliances. As a specific example, these cooking appliances may include induction heating rice cookers which require materials with LDS capabilities as well as high heat, good flame retardance, and good ductility properties. Compositions of the present disclosure provide these properties and are thus well suited for these applications.

In a further aspect, non-limiting examples of fields in which the thermoplastic compositions can be employed can include electrical, electro-mechanical, radio frequency (RF) technology, telecommunication, automotive, aviation, medical, sensor, military, and security. In a still further aspect, the thermoplastic compositions can also be present in overlapping fields, such as mechatronic systems that integrate mechanical and electrical properties which can, for example, be used in automotive or medical engineering. In a further aspect, the suitable article can be an electronic device, automotive device, telecommunication device, medical device, security device, or mechatronic device. In a still further aspect, the article can be selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device. In yet a further aspect, the article can be selected from a computer device, sensor device, security device, RF antenna device, LED device and RFID device.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polymeric base resin" includes mixtures of two or more polymeric base resins.

As used herein, the term "combination" is inclusive of blends, mixtures, alloys, reaction products, and the like.

As used herein, "polysilane" refers to organo-silicon polymer compounds having the formula $(R_2Si)_n$. The polymer backbone is made up of silicon-silicon bonds with two substituents (R) attached to each silicon atom.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive materials" means that the additive materials can or cannot be included and that the description includes thermoplastic compositions that both include and that do not include additive materials.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein the terms "weight percent," "wt. %," and "wt. %," which can be used interchangeably, indicate the percent by weight of a given component based on the total weight of the composition, unless otherwise specified. That is, unless otherwise specified, all wt. % values are based on the total weight of the composition. It should be understood that the sum of wt. % values for all components in a disclosed composition or formulation are equal to 100.

Certain abbreviations are defined as follows: "g" is grams, "kg" is kilograms, "° C." is degrees Celsius, "min" is minutes, "mm" is millimeter, "mPa" is megapascal, "WiFi" is a system of accessing the internet from remote machines, "GPS" is Global Positioning System—a global system of U.S. navigational satellites which provide positional and velocity data. "LED" is light-emitting diode, "RF" is radio frequency, and "RFID" is radio frequency identification.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Aspects of the Disclosure

In various aspects, the present disclosure pertains to and includes at least the following aspects.

Aspect 1. A laser platable thermoplastic composition comprising, consisting of, or consisting essentially of: a polyarylene ether component; a laser direct structuring additive; a flame retardant additive; and an impact modifier; wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect. 2 The laser platable thermoplastic composition of claim 1 further comprising a silicon component.

Aspect 3. The laser platable thermoplastic composition of claim 1, further comprising a silicon component selected from a polysiloxane, a polysilane, or a silane.

Aspect 4. The laser platable thermoplastic composition of claim 1, further comprising a laser direct structuring synergist.

Aspect 5. The laser platable thermoplastic composition of claim 2, wherein the laser direct structuring synergist comprises an inorganic filler or a siloxane-based polymer.

Aspect 6. The laser platable thermoplastic composition of any one of claims 1-5, wherein the polyarylene ether component comprises polyphenylene ether.

Aspect 7. The laser platable thermoplastic composition of any one of claims 1-5, wherein the polyarylene ether component comprises a polyarylene ether, a polyarylene ether copolymer, or a combination thereof.

Aspect 8. The laser platable thermoplastic composition of any one of claims 1-5, wherein the polyarylene ether component comprises a polyphenyl ether siloxane copolymer.

Aspect 9. The laser platable thermoplastic composition of any of claims 1-8, wherein the impact modifier has a viscosity of less than 3 grams per 10 minutes at 230° C./5 kilograms, when tested in accordance with ASTM 1238.

Aspect 10. The laser platable thermoplastic composition of any one of claims 1-8, wherein the impact modifier comprises styrene-based copolymers selected from the group consisting of styrene ethylene butylene styrene copolymer (SEBS), styrene butadiene styrene (SBS), styrene ethylene propylene styrene (SEPS) and combinations thereof.

Aspect 11. The laser platable thermoplastic composition of any one of claims 1-8, wherein the impact modifier is styrene ethylene butylene styrene copolymer (SEBS).

Aspect 12. The laser platable thermoplastic composition of any one of claims 1-8, wherein the impact modifier is styrene ethylene butylene styrene copolymer having a viscosity less than 3 grams per 10 minutes at 230° C./5 kilograms, when tested in accordance with ASTM 1238.

Aspect 13. The laser platable thermoplastic composition of any one of claims 1-12, wherein the laser direct structuring additive is a metal compound comprising heavy metal mixed oxide spinel, copper salt or combination thereof.

Aspect 14. The laser platable thermoplastic composition of claim 13, wherein the heavy metal mixed oxide spinel is a copper chromite black spinel.

Aspect 15. The laser platable thermoplastic composition of claim 13, wherein the copper salt is a copper hydroxide phosphate.

Aspect 16. The laser platable thermoplastic composition of any one of claims 1-13, wherein the flame retardant comprises phosphorous.

Aspect 17. The laser platable thermoplastic composition of any one of claims 1-16, wherein the flame retardant comprises bisphenol A bis(diphenyl phosphate) (BPADP) or phenoxyphosphazene (PPZ).

Aspect 18. The laser platable thermoplastic composition of any one of claims 1-17, further comprising a stabilizer selected from magnesium oxide, zinc sulfide, phosphite and combination thereof.

Aspect 19. The laser platable thermoplastic composition of any one of claims claim 2-18 wherein laser direct structuring synergist comprises polysiloxane, silane, polysilane or combination thereof.

Aspect 20. The laser platable thermoplastic composition of any one of claims 1-19, wherein the composition comprises: from about 50 wt. % to 90 wt. % of the polyarylene ether component; from about 0.01 wt. % to about 20 wt. % of the laser direct structuring additive; from about 0.01 wt. % to about 15 wt. % of the flame retardant; and from about 0.01 wt. % to about 20 wt. % of the impact modifier.

Aspect 21. The laser platable thermoplastic composition of any one of claims 1-20, wherein the impact modifier is present in an amount from about 3 wt. % to about 25 wt. %.

Aspect 22. The laser platable thermoplastic composition of any one of claims 1-20, wherein the impact modifier is present in an amount of from about 5 wt. % to about 15 wt. % relative to the total weight of the composition.

Aspect 23. The laser platable thermoplastic composition of any one of claims 1-22, further comprising an inorganic filler wherein the inorganic filler is present in an amount of 0.1-10% by weight, preferably 0.1-8% by weight, and more preferably 0.5-5% by weight relative to the total weight of the composition.

Aspect 24. The laser platable thermoplastic composition of any one of claims 1-23, wherein the flame retardant is present in an amount from 5 wt. % to 15 wt. % based on the total weight of the composition.

Aspect 25. The laser platable thermoplastic composition of any one of claims 1-24, wherein the polyarylene ether component is present in an amount from 50 wt. % to 90 wt. %.

Aspect 26. The laser platable thermoplastic composition of any one of claims 1-25, wherein the polyarylene ether component is present in an amount from 60 wt. % to 85% wt. % based on the total weight of the composition.

Aspect 27. The laser platable thermoplastic composition of any one of claims 4-26, wherein the laser direct structuring synergist present in an amount of 0.1 wt. % to about 10 wt. %.

Aspect 28. A method of manufacturing an article comprising molding an article from the laser platable composition of any one of claims 1-27, exposing the article to a laser to form an activated area, and plating a metal layer onto the activated area.

Aspect 28. A laser platable thermoplastic composition comprising, consisting of, or consisting essentially of: from about 50 wt. % to 90 wt. % of a polyarylene ether, a polyarylene ether copolymer, or a combination thereof; from about 0.01 wt. % to about 20 wt. % of a laser direct structuring additive; from about 0.01 wt. % to about 15 wt. % of a flame retardant; from about 0.01 wt. % to about 5 wt. % of a laser direct structuring additive synergist, wherein the laser direct structuring additive synergist comprises a polysiloxane, a silane, a polysilane or combination thereof and from about 0.01 wt. % to about 20 wt. % of an impact modifier, wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect 29. A method of forming a laser platable thermoplastic composition comprising, consisting of, or consisting essentially of: combining: a polyarylene ether, polyarylene ether copolymer or a combination thereof; a laser direct structuring additive; a flame retardant; and an impact modifier; an inorganic filler selected from talc, clay, mica, wollastonite, titanium dioxide and a mixture thereof; wherein the laser platable thermoplastic composition is capable of being plated after being activated using a laser.

Aspect 30. A laser platable thermoplastic composition comprising, consisting of, or consisting essentially of: a polyarylene ether component, wherein the polyarylene ether comprises a polyarylene ether siloxane copolymer; a laser direct structuring additive; and a flame retardant additive, wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect 31. A laser platable thermoplastic composition comprising, consisting of, or consisting essentially of: a polyarylene ether component, wherein the polyarylene ether comprises a polyarylene ether siloxane copolymer; a laser direct structuring additive; a flame retardant additive; and an impact modifier; wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect 32. The laser platable thermoplastic composition of any one of claims 30-31, further comprising a laser direct structuring synergist.

Aspect 33. The laser platable thermoplastic composition of any one of claims 30-32, wherein the polyarylene ether component comprises a polyphenyl ether siloxane copolymer.

Aspect 34. The laser platable thermoplastic composition of any of claims 31-33, wherein the impact modifier has a viscosity of less than 3 grams per 10 minutes at 230° C./5 kilograms, when tested in accordance with ASTM D1238.

Aspect 35. The laser platable thermoplastic composition of any one of claims 31-33, wherein the impact modifier comprises styrene-based copolymers selected from the group consisting of styrene ethylene butylene styrene copolymer (SEBS), styrene butadiene styrene (SBS), styrene ethylene propylene styrene (SEPS) and combinations thereof.

Aspect 36. The laser platable thermoplastic composition of any one of claims 31-33, wherein the impact modifier is styrene ethylene butylene styrene copolymer having a viscosity less than 3 grams per 10 minutes at 230° C./5 kilograms, when tested in accordance with ASTM D1238.

Aspect 37. The laser platable thermoplastic composition of any one of claims 30-36, wherein the laser direct structuring additive is a metal compound comprising heavy metal mixed oxide spinel, copper salt or combination thereof.

Aspect 38. The laser platable thermoplastic composition of claim 37, wherein the heavy metal mixed oxide spinel is a copper chromite black spinel.

Aspect 39. The laser platable thermoplastic composition of claim 37, wherein the copper salt is a copper hydroxide phosphate.

Aspect 40. The laser platable thermoplastic composition of any one of claims 30-39, wherein the flame retardant comprises phosphorous.

Aspect 41. The laser platable thermoplastic composition of any one of claims 30-40, wherein the flame retardant comprises bisphenol A bis(diphenyl phosphate) (BPADP) or phenoxyphosphazene (PPZ).

Aspect 42. The laser platable thermoplastic composition of any one of claims claim 30-41, further comprises a stabilizer selected from magnesium oxide, zinc sulfide, phosphite and combination thereof.

Aspect 43. The laser platable thermoplastic composition of any one of claims claim 30-42 wherein laser direct structuring synergist comprises a polysiloxane, a silane, a polysilane, or a combination thereof.

Aspect 44. The laser platable thermoplastic composition of any one of claims 31-43, wherein the composition comprises: from 50 wt. % to 90 wt. % of the polyarylene ether component; from 0.01 wt. % to 20 wt. % of the laser direct structuring additive; from 0.01 wt. % to 15 wt. % of the flame retardant; from 0.1 wt. % to 10 wt. % of a silicon component, and from 0.01 wt. % to 20 wt. % of the impact modifier.

Aspect 45. The laser platable thermoplastic composition of any one of claims 31-44, wherein the impact modifier is present in an amount of from 5 wt. % to 15 wt. % relative to the total weight of the composition.

Aspect 46. A laser platable thermoplastic composition comprising, consisting of, or consisting essentially of: from 50 wt. % to 90 wt. % of a polyarylene ether, a polyarylene ether copolymer, or a combination thereof; from 0.01 wt. % to 20 wt. % of a laser direct structuring additive; from 0.01 wt. % to 15 wt. % of a flame retardant; from 0.1 wt. % to 10 wt. % of a laser direct structuring additive synergist, wherein the laser direct structuring additive synergist comprises a polysiloxane, a silane, a polysilane or combination thereof; and from 0.01 wt. % to 20 wt. % of an impact modifier, wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect 47. A method of forming a laser platable thermoplastic composition comprising, consisting of, or consisting essentially of: combining: a polyarylene ether, polyarylene ether copolymer or a combination thereof; a laser direct structuring additive; a flame retardant; and an impact modifier; an inorganic filler selected from talc, clay, mica, wollastonite, titanium dioxide and a mixture thereof; wherein the laser platable thermoplastic composition is capable of being plated after being activated using a laser.

Aspect 48. A laser platable thermoplastic composition comprising, consisting of, or consisting essentially of: a polyarylene ether component; a laser direct structuring additive; a flame retardant additive; a silicon component; and an impact modifier; wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect 49. The laser platable thermoplastic composition of claim 48, wherein the silicon component comprises a polysiloxane copolymer of the polyarylene ether.

Aspect 50. The laser platable thermoplastic composition of claim 48, wherein the silicon component comprises a laser direct structuring additive synergist comprising a polysiloxane, a silane, a polysilane, or a combination thereof.

Aspect 51. A laser platable thermoplastic composition comprising, consisting of, or consisting essentially of: a polyarylene ether component; a laser direct structuring additive; a flame retardant additive comprising bisphenol A bis(diphenyl phosphate) (BPADP) or phenoxyphosphazene (PPZ); and an impact modifier comprising a styrene-based copolymer selected from the group consisting of styrene ethylene butylene styrene copolymer (SEBS), styrene butadiene styrene (SBS), styrene ethylene propylene styrene (SEPS) and combinations thereof; wherein the laser platable thermoplastic composition is capable of being plated after being activated using a laser, wherein the laser platable thermoplastic composition exhibits a plating index of greater than 0.8 when tested using X-ray fluorescence, and wherein the laser platable thermoplastic composition exhibits a heat deflection temperature of greater than 150° C. at 0.45 MPa/3.2 mm when tested in accordance with ASTM D648.

Aspect 52. The laser platable thermoplastic composition of Aspect 51, further comprising a laser direct structuring synergist.

Aspect 53. The laser platable thermoplastic composition of Aspect 52, wherein the laser direct structuring synergist comprises an inorganic filler or a siloxane-based polymer.

Aspect 54. The laser platable thermoplastic composition of any one of Aspects 51-53, wherein the polyarylene ether component comprises a polyarylene ether, a polyarylene ether copolymer, or a combination thereof.

Aspect 55. The laser platable thermoplastic composition of any one of Aspects 51-53, wherein the polyarylene ether component comprises a polyarylene ether siloxane copolymer.

Aspect 56. The laser platable thermoplastic composition of any one of Aspects 51-53, wherein the polyarylene ether component comprises a polyphenyl ether siloxane copolymer.

Aspect 57. The laser platable thermoplastic composition of any of Aspects 51-56, wherein the impact modifier has a viscosity of less than 3 grams per 10 minutes at 230° C./5 kilograms, when tested in accordance with ASTM D1238.

Aspect 58. The laser platable thermoplastic composition of any one of Aspects 51-57, wherein the impact modifier is styrene ethylene butylene styrene copolymer having a viscosity less than 3 grams per 10 minutes at 230° C./5 kilograms, when tested in accordance with ASTM D1238.

Aspect 59. The laser platable thermoplastic composition of any one of Aspects 51-58, wherein the laser direct structuring additive is a metal compound comprising heavy metal mixed oxide spinel, copper salt or combination thereof.

Aspect 60. The laser platable thermoplastic composition of Aspect 59, wherein the heavy metal mixed oxide spinel is a copper chromite black spinel.

Aspect 61. The laser platable thermoplastic composition of Aspect 59, wherein the copper salt is a copper hydroxide phosphate.

Aspect 62. The laser platable thermoplastic composition of any one of Aspects 51-61 further comprises a stabilizer selected from magnesium oxide, zinc sulfide, phosphite and combination thereof.

Aspect 63. The laser platable thermoplastic composition of any one of Aspects 51-62 wherein laser direct structuring synergist comprises a polysiloxane, a silane, a polysilane, or a combination thereof.

Aspect 64. The laser platable thermoplastic composition of any one of Aspects 51-63, wherein the composition comprises: from 50 wt. % to 90 wt. % of the polyarylene ether component; from 0.01 wt. % to 20 wt. % of the laser direct structuring additive; from 0.01 wt. % to 15 wt. % of the flame retardant; and from 0.01 wt. % to 20 wt. % of the impact modifier.

Aspect 65. The laser platable thermoplastic composition of any one of Aspects 51-64, wherein the impact modifier is present in an amount of from 5 wt. % to 15 wt. % relative to the total weight of the composition.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt. %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The compositions as set forth in the Examples below were prepared from the components presented in Table 1.

TABLE 1

| Item | Item Description | Unit | C1.1 | E1.1 | E1.2 | E1.3 |
|---|---|---|---|---|---|---|
| PPO | Poly(p-phenylene oxide), 0.40 dl/g intrinsic viscosity (IV) | % | 72.7 | 72.7 | 74.7 | |
| PPO-Silox | PPO-Siloxane D45 siloxane block copolymer having 5% ± 0.5% by weight siloxane | % | | | | 76.7 |
| $IM_{low}$ | Styrene ethylene butylene styrene copolymer (SEBS) from KRATON ™ SEBS G1652, low viscosity (melt Index higher than 3 g/10 min at 230° C./5 kg); impact modifier | % | 8 | | | |
| $IM_{high}$ | KRATON ™ SEBS G1651, high viscosity (melt Index lower than 1 g/10 min at 230° C./5 kg); impact modifier | % | | 8 | 8 | 6 |
| FR1 | Bisphenol A bis(diphenyl phosphate), BPADP | % | 10 | 10 | | 8 |
| FR2 | Phenoxy phosphazene (PPZ) | % | | | 8 | |
| LDS | copper chromite black Spinel, CuCrO | % | 8 | 8 | 8 | 8 |
| LLDPE | Linear low density polyethylene (LLDPE); mold release agent | % | 1 | 1 | 1 | 1 |
| F00873 | Magnesium oxide; MAG OXIDE | % | 0.1 | 0.1 | 0.1 | 0.1 |
| F112 | Zinc sulfide; Zinc sulfide | % | 0.1 | 0.1 | 0.1 | 0.1 |
| STAB1 | Phosphite Stabilizer; IRGAFOS ™ 168 | % | 0.1 | 0.1 | 0.1 | 0.1 |

Formulations were prepared by extruding the pre-blended components using a twin extruder. The polymer base resin, thermally conductive fillers, white pigment, optical brightening agents and any additional additives were first dry blended together, then fed into a The extrudate was cooled using a water bath prior to pelletizing. Components were compounded using a L/D at 40.5 Toshiba® TEM-37BS Twin Screw Extruder co-rotating twin screw extruder with extrusion settings presented in Table 2.

TABLE 2

| Extrusion Conditions. | | |
|---|---|---|
| Parameters | Unit | Extrusion Condition |
| Compounder Type | NONE | TEM-37BS |
| Barrel Size | mm | 1500 |
| Die | mm | 4 |
| Zone 1 Temp | ° C. | 90 |
| Zone 2 Temp | ° C. | 150 |

TABLE 2-continued

Extrusion Conditions.

| Parameters | Unit | Extrusion Condition |
|---|---|---|
| Zone 3 Temp | ° C. | 280 |
| Zone 4 Temp | ° C. | 280 |
| Zone 5 Temp | ° C. | 280 |
| Zone 6 Temp | ° C. | 280 |
| Zone 7 Temp | ° C. | 280 |
| Zone 8 Temp | ° C. | 290 |
| Zone 9 Temp | ° C. | 290 |
| Zone 10 Temp | ° C. | 290 |
| Zone 11 Temp | ° C. | 290 |
| Die Temp | ° C. | 290 |
| Screw speed | rpm | 300 |
| Throughput | kg/hr | 30 |
| Torque | NONE | 50-60 |
| Vacuum 1 | MPa | −0.08 |
| Side Feeder 1 speed | rpm | 250 |
| Melt temperature | NONE | 280-290 |

The pellets obtained from extrusion were then injection molded using 150 T injection molding machine at a melt temperature of 280° C. and a mold temperature of 80° C. The injection molding profile is presented in Table 3.

TABLE 3

Injection molding profile.

| Parameters | Unit | Molding Condition |
|---|---|---|
| Cnd: Pre-drying time | Hour | 3 |
| Cnd: Pre-drying temp | ° C. | 105 |
| Molding Machine | NONE | FANUC, UH1000-110 |
| Mold Type (insert) | NONE | ASTM Tensile, Flexural, Izod bars, 90*50*2.54 mm Color Chips, 2.0 & 1.5 & 1.0 mm thickness UL bars |
| Hopper temp | ° C. | 50 |
| Zone 1 temp | ° C. | 270-280 |
| Zone 2 temp | ° C. | 280-290 |
| Zone 3 temp | ° C. | 290-300 |
| Nozzle temp | ° C. | 280-290 |
| Mold temp | ° C. | 90-120 |
| Screw speed | rpm | 100 |
| Back pressure | kgf/cm$^2$ | 90 |
| Cooling time | s | 15-30 |
| Injection speed | mm/s | 25-500 |
| Holding pressure | kgf/cm$^2$ | 600-1000 |
| Max. Injection pressure | kgf/cm$^2$ | 1000-2500 |

The formulation and molded sample performance testing for the prepared laser platable compositions are presented in Table 4. Comparative example C1.1

TABLE 4

Properties of the laser platable compositions.

| Typical Property | Test Method | Test Description | Unit | C1.1 | E1.1 | E1.2 | E1.3 |
|---|---|---|---|---|---|---|---|
| Density | Specific Gravity | ASTM D792 | g/cm$^3$ | 1.160 | 1.158 | 1.150 | 1.148 |
| MVR | 300° C./5.0 kg | ASTM D1238 | cm$^3$/10 min | 38.2 | 21.8 | 13.3 | 8.2 |
| Notched IZOD | 23° C., 5 lbf/ft | ASTM D256 | J/m | 85 | 231 | 378 | 295 |
| Ductility | 23° C., 5 lbf/ft | ASTM D256 | % | 60 | 100 | 100 | 100 |
| Notched IZOD | −20° C., 5 lbf/ft | ASTM D256 | J/m | 47 | 124 | 161 | 118 |
| HDT | 0.45 MPa/3.2 mm | ASTM D648 | ° C. | 148 | 153 | 172 | 157 |
| HDT | 1.82 MPa/3.2 mm | ASTM D648 | ° C. | 130 | 137 | 153 | 139 |
| Flexural Modulus | 3.2 mm, 1.27 mm/min | ASTM D790 | MPa | 2250 | 2370 | 2100 | 2250 |
| Flexural Strength | at break, 3.2 mm, 1.27 mm/min | ASTM D790 | MPa | 96 | 101 | 88 | 93 |
| Tensile Modulus | 50 mm/min | ASTM D638 | MPa | 2355 | 2416 | 2095 | 2218 |
| Tensile Strength | at yield, 50 mm/min | ASTM D638 | MPa | 64 | 67 | 59 | 62 |
| Tensile Strength | at break, 50 mm/min | ASTM D638 | MPa | 54 | 50 | 50 | 48 |
| Tensile Elongation | at break, 50 mm/min | ASTM D638 | % | 15.0 | 10.6 | 18.1 | 10.0 |
| FR rating | 2.0 mm, normal | UL94 | / | V0 | V0 | V0 | V0 |
| FOT (10 bars) | | | s | 68.5 | 71.1 | 63.6 | 70.8 |
| FR rating | 2.0 mm, aging | UL94 | / | V0 | V0 | V0 | V0 |
| FOT (10 bars) | | | s | 54.6 | 78 | 65.2 | 42.3 |
| FR rating | 1.5 mm, normal | UL94 | / | V1 | V0 | V0 | V0 |
| FOT (10 bars) | | | s | 96.4 | 69.8 | 43.9 | 77.5 |
| FR rating | 1.5 mm, aging | UL94 | / | V1 | V0 | V0 | V0 |
| FOT (10 bars) | | | s | 97.2 | 72.1 | 72.7 | 68 |
| FR rating | 1.0 mm, normal | UL94 | / | V1 | V1 | V1 | V0 |
| FOT (10 bars) | | | s | 99.4 | 78.9 | 104.5 | 71.5 |
| FR rating | 1.0 mm, aging | UL94 | / | V1 | V0 | V0 | V0 |
| FOT (10 bars) | | | s | 119.3 | 75.8 | 71.9 | 85.6 |

\* Note:
FOT means Flameout Time when doing the FR test. The total FOT of 10 UL bars was shown in Table 4.

Plating performance of the laser platable compositions was also determined. Plating index is defined as the ratio between average copper thickness obtained under a specific laser parameter of the tested sample and that of the reference sample. The reference sample was a PBT-based LDS formulation commercially available as Pocan DP 7102. Usually, plating index of qualified LDS performance needs to be higher than 0.7.

The laser treatment used LPKF Microline 3D laser system and the plating treatment used Macdermaid copper plating solutions. The plating Index (PI) was measured by X-ray fluorescence measurement (using Fischer XDL230) and calculated according to Formula A described above. Table 5 summarizes the results for the plating performance.

TABLE 5

| Power (W) | Frequency (KHz) | Speed (m/s) | C1.1 | E1.1 | E1.2 | E1.3 |
|---|---|---|---|---|---|---|
| 10 | 100 | 2 | 0.69 | 0.83 | 0.87 | 0.78 |
| 10 | 70 | 2 | 0.70 | 0.82 | 0.88 | 0.77 |
| 10 | 40 | 2 | 0.73 | 0.82 | 0.94 | 0.78 |
| 2 | 100 | 2 | 0.85 | 0.91 | 1.02 | 0.91 |
| 2 | 70 | 2 | 0.86 | 0.95 | 1.02 | 0.94 |
| 2 | 40 | 2 | 0.89 | 0.92 | 0.91 | 0.93 |
| 7 | 80 | 4 | 0.88 | 0.96 | 0.97 | 0.93 |
| 5 | 80 | 4 | 0.86 | 0.90 | 0.98 | 0.92 |

TABLE 5-continued

| Power (W) | Frequency (KHz) | Speed (m/s) | C1.1 | E1.1 | E1.2 | E1.3 |
|---|---|---|---|---|---|---|
| 3 | 80 | 4 | 0.77 | 0.77 | 0.85 | 0.78 |
| 3 | 100 | 2 | 0.85 | 0.97 | 0.94 | 0.88 |
| 3 | 70 | 2 | 0.86 | 0.97 | 0.96 | 0.92 |
| 3 | 40 | 2 | 0.91 | 0.93 | 0.92 | 0.89 |
| 5 | 100 | 4 | 0.90 | 0.98 | 1.01 | 0.98 |
| 3 | 100 | 4 | 0.68 | 0.67 | 0.81 | 0.74 |
| 9 | 80 | 4 | 0.80 | 0.91 | 0.92 | 0.85 |
| 5 | 100 | 2 | 0.68 | 0.86 | 0.87 | 0.77 |
| 5 | 70 | 2 | 0.78 | 0.89 | 0.89 | 0.76 |
| 5 | 40 | 2 | 0.83 | 0.82 | 0.89 | 0.80 |
| 11 | 100 | 4 | 0.83 | 0.87 | 0.92 | 0.87 |
| 9 | 100 | 4 | 0.81 | 0.90 | 0.92 | 0.84 |
| 7 | 100 | 4 | 0.85 | 0.91 | 0.93 | 0.89 |
| 8 | 100 | 2 | 0.60 | 0.76 | 0.81 | 0.67 |
| 8 | 70 | 2 | 0.68 | 0.78 | 0.81 | 0.65 |
| 8 | 40 | 2 | 0.76 | 0.74 | 0.83 | 0.75 |
| Plating Index-Avg (PI-Avg) | | | 0.79 | 0.87 | 0.91 | 0.83 |

Formulations were also prepared including a polysiloxane or an inorganic filler to improve plating performance. The combination of the BPADP and PPZ was used in the formulation to balance the flow, FR, heat, and impact performance of the composition (E2.4, Table 6). The formulations E2.1 to E2.4 are presented in Table 6.

TABLE 6

Formulations with polysiloxane or clay filler.

| Item | Item Description | Unit | E2.1 | E2.2 | E2.3 | E2.4 |
|---|---|---|---|---|---|---|
| PPO | Poly(p-phenylene oxide), 0.40 dl/g IV | % | 71.7 | 73.7 | 73.7 | 73.7 |
| $IM_{low}$ | SEBS G1651 from KRATON ™ | % | 8 | 8 | 8 | 8 |
| FR1 | Bisphenol A bis(diphenyl phosphate) BPADP; flame retardant additive | % | 10 | 10 | | 5 |
| FR2 | PhenoxyPhosphazene (PPZ); flame retardant additive | % | | | 8 | 4 |
| LDS | Copper chromite black spinel, CuCrO | % | 8 | 6 | 6 | 8 |
| Silox | Polysiloxane from Momentive (SFR100); dimethyl/diphenylpolysiloxane; a mixture with the main composition of 60-70% hydroxyl-terminated siloxanes and silicones and 30-40% silicone resin | % | 1 | 1 | | |
| Clay | Clay, uncalcined hydrated aluminum silicate | % | | | 3 | |
| LLDPE | Linear low density polyethylene, mold release | % | 1 | 1 | 1 | 1 |
| MgO | Magnesium oxide | % | 0.1 | 0.1 | 0.1 | 0.1 |
| ZnS | Zinc sulfide | % | 0.1 | 0.1 | 0.1 | 0.1 |
| STAB1 | Phosphite Stabilizer | % | 0.1 | 0.1 | 0.1 | 0.1 |

Samples E2.2 through E2.4 exhibited improved plating performance, good flame retardancy, high heat property and good ductility are shown in Table 6. Physical, mechanical, FR, and detailed plating performance of the developed laser platable compositions with improved plating performance and balanced overall properties are shown in Table 7 and Table 8, respectively.

TABLE 7

Mechanical properties of the laser platable compositions with clay and/or polysiloxane.

| Typical Property | Test Method | Test Description | Unit | E2.1 | E2.2 | E2.3 | E2.4 |
|---|---|---|---|---|---|---|---|
| Density | Specific Gravity | ASTM D792 | g/cm³ | 1.153 | 1.131 | 1.154 | 1.157 |
| MVR | 300° C./5.0 kg | ASTM D1238 | cm³/10 min | 19.9 | 18.9 | 12.7 | 15.6 |
| Notched IZOD | 23° C., 5 lbf/ft | ASTM D256 | J/m | 258 | 290 | 259 | 265 |

TABLE 7-continued

Mechanical properties of the laser platable compositions with clay and/or polysiloxane.

| Typical Property | Test Method | Test Description | Unit | E2.1 | E2.2 | E2.3 | E2.4 |
|---|---|---|---|---|---|---|---|
| Ductility | 23° C., 5 lbf/ft | ASTM D256 | % | 100 | 100 | 100 | 100 |
| Notched IZOD | −20° C., 5 lbf/ft | ASTM D256 | J/m | 121 | 145 | 141 | 101 |
| HDT | 0.45 MPa/3.2 mm | ASTM D648 | ° C. | 152 | 153 | 173 | 161 |
| HDT | 1.82 MPa/3.2 mm | ASTM D648 | ° C. | 134 | 135 | 154 | 144 |
| Flexural Modulus | 3.2 mm, 1.27 mm/min | ASTM D790 | MPa | 2290 | 2310 | 2180 | 2250 |
| Flexural Strength | @break, 3.2 mm, 1.27 mm/min | ASTM D790 | MPa | 94 | 94 | 91 | 92 |
| Tensile Modulus | 50 mm/min | ASTM D638 | MPa | 2345 | 2112 | 2194 | 2196 |
| Tensile Strength | @yield, 50 mm/min | ASTM D638 | MPa | 63 | 62 | 61 | 63 |
| Tensile Strength | @break, 50 mm/min | ASTM D638 | MPa | 50 | 50 | 47 | 49 |
| Tensile Elongation | @break, 50 mm/min | ASTM D638 | % | 13.7 | 8.5 | 19.2 | 10.8 |
| FR rating FOT (10 bars) | 2.0 mm, normal | UL94 | / s | V0 79.2 | V0 76.7 | V0 49.8 | V0 73.4 |
| FR rating FOT (10 bars) | 2.0 mm, aging | UL94 | / s | V0 64.4 | V0 60.9 | V0 48.5 | V0 53.1 |
| FR rating FOT (10 bars) | 1.5 mm, normal | UL94 | / s | V0 81.2 | V0 76.7 | V0 68.6 | V0 66.0 |
| FR rating FOT (10 bars) | 1.5 mm, aging | UL94 | / s | V1 92.9 | V1 129.4 | V0 64.9 | V0 70.6 |

TABLE 8

Plating performance of the laser platable compositions with clay and/or polysiloxane.

| Power (W) | Frequency (KHz) | Speed (m/s) | E2.1 | E2.2 | E2.3 | E2.4 |
|---|---|---|---|---|---|---|
| 10 | 100 | 2 | 1.05 | 0.71 | 0.89 | 0.81 |
| 10 | 70 | 2 | 1.07 | 0.75 | 0.91 | 0.82 |
| 10 | 40 | 2 | 1.16 | 0.79 | 0.97 | 0.92 |
| 2 | 100 | 2 | 1.21 | 0.82 | 1.01 | 0.95 |
| 2 | 70 | 2 | 1.24 | 0.89 | 1.05 | 1.00 |
| 2 | 40 | 2 | 1.21 | 0.86 | 1.02 | 0.94 |
| 7 | 80 | 4 | 1.26 | 0.95 | 1.05 | 0.99 |
| 5 | 80 | 4 | 1.24 | 0.88 | 1.01 | 0.97 |
| 3 | 80 | 4 | 1.02 | 0.70 | 0.86 | 0.84 |
| 3 | 100 | 2 | 1.23 | 0.95 | 1.06 | 0.93 |
| 3 | 70 | 2 | 1.24 | 0.94 | 1.05 | 0.94 |
| 3 | 40 | 2 | 1.20 | 0.81 | 1.01 | 0.96 |
| 5 | 100 | 4 | 1.27 | 0.98 | 0.99 | 0.99 |
| 3 | 100 | 4 | 0.92 | 0.60 | 0.75 | 0.79 |
| 9 | 80 | 4 | 1.18 | 0.87 | 0.96 | 0.93 |
| 5 | 100 | 2 | 1.06 | 0.83 | 0.93 | 0.79 |
| 5 | 70 | 2 | 1.10 | 0.83 | 0.93 | 0.86 |
| 5 | 40 | 2 | 1.10 | 0.79 | 0.95 | 0.91 |
| 11 | 100 | 4 | 1.13 | 0.91 | 0.93 | 0.92 |
| 9 | 100 | 4 | 1.18 | 0.93 | 0.94 | 0.90 |
| 7 | 100 | 4 | 1.25 | 0.99 | 0.97 | 0.90 |
| 8 | 100 | 2 | 0.97 | 0.75 | 0.87 | 0.75 |
| 8 | 70 | 2 | 1.01 | 0.75 | 0.86 | 0.80 |
| 8 | 40 | 2 | 1.03 | 0.73 | 0.84 | 0.83 |
| Plating Index-Avg (PI-Avg) | | | 1.14 | 0.83 | 0.95 | 0.89 |

With the addition of polysiloxane (as in E2.1), the composition still exhibited a desirable impact strength (NII of 258 J/m at 23° C.), high heat (HDT of 152° C. at 0.45 MPa), and good FR (V1 at 1.5 mm) performance. More interestingly, plating performance of the composition was greatly improved due to the polysiloxane as the average PI value of 1.14 (E2.1, Table 8) was more than 30% higher than that for the sample in the absence of polysiloxane (E1.1, Table 5). Because of the presence of the polysiloxane, it appears that a lower amount of LDS additive was needed to achieve the desired plating performance. Although loading of the copper chromite black spinel (LDS additive) was decreased from 8% to 6% (compare E2.1 to E2.2), the plating performance of the composition was still satisfied with the average PI value of 0.83 (E2.2).

The inorganic filler clay also appeared to exhibit synergistic effects with the components of the laser platable compositions. As in shown in E2.3, Table 6 & Table 8, Introducing 3% clay filler and decreasing the loading of the LDS additive 6% (Compare E1.2 to E2.3), resulted in a consistent plating performance, having the average PI value of 0.95. The flame performance and thermal performance of the composition was good as well, showing the FR rating of V0 1.5 mm and the HDT of 173° C. at 0.45 MPa (E2.3, Table 7). Although ductility of the composition did decrease because of the addition of clay, the ductility was still at a desirable level (NII of 259 J/m).

The phosphorous compound was used as the FR additive to balance the flow, FR, heat, and impact performance of the composition. As shown in E2.4, Table 6 & Table 7, when combination of the BPADP and PPZ were used in the formulation, the composition could also have good FR (V0 1.5 mm), high heat (HDT of 161° C. at 0.45 MPa), and good impact (NII of 265 J/m at 23° C.) performance. Meanwhile, plating performance of the composition was good with the average PI value of 0.89 (E2.4, Table 8).

As demonstrated, polysiloxane and inorganic fillers could be used in the formulation to help to improve the plating performance of the composition. Combination of phosphorous FR additives could be applied to balance the overall performance of the composition. Plating index (PI) of the compositions could be always higher than 0.8, indicating that the developed compositions had good plating performance. FR rating of the compositions could be up to V0 1.0 mm; HDT could be always higher than 150° C. at 0.45 MPa; and Notched Izod could be higher than 200 J/m at 23° C. with 100% ductility. The developed compositions here could be suitable for the application areas that require flame retardant LDS grades with high heat performance.

The examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

That which is claimed is:

1. A laser platable thermoplastic composition comprising:
   a polyarylene ether component comprising a polyarylene ether siloxane copolymer or a polyphenyl ether siloxane copolymer;
   a laser direct structuring additive;
   a flame retardant additive comprising bisphenol A bis (diphenyl phosphate) (BPADP) or phenoxyphosphazene (PPZ); and
   an impact modifier comprising a styrene-based copolymer selected from the group consisting of styrene ethylene butylene styrene copolymer (SEBS), styrene butadiene styrene (SBS), styrene ethylene propylene styrene (SEPS) and combinations thereof;
   wherein the laser platable thermoplastic composition is capable of being plated after being activated using a laser, and
   wherein the laser platable thermoplastic composition exhibits a heat deflection temperature of greater than 150° C. at 0.45 MPa/3.2 mm when tested in accordance with ASTM D648.

2. The laser platable thermoplastic composition of claim 1, further comprising a laser direct structuring synergist.

3. The laser platable thermoplastic composition of claim 2, wherein the laser direct structuring synergist comprises an inorganic filler or a siloxane-based polymer.

4. The laser platable thermoplastic composition of claim 1, wherein the polyarylene ether component comprises a polyarylene ether, a polyarylene ether copolymer, or a combination thereof.

5. The laser platable thermoplastic composition of claim 1, wherein the impact modifier has a viscosity of less than 3 grams per 10 minutes at 230° C./5 kilograms, when tested in accordance with ASTM D1238.

6. The laser platable thermoplastic composition of claim 1, wherein the impact modifier is styrene ethylene butylene styrene copolymer having a viscosity less than 3 grams per 10 minutes at 230° C./5 kilograms, when tested in accordance with ASTM D1238.

7. The laser platable thermoplastic composition of claim 1, wherein the laser direct structuring additive is a metal compound comprising heavy metal mixed oxide spinel, copper salt or combination thereof.

8. The laser platable thermoplastic composition of claim 7, wherein the heavy metal mixed oxide spinel is a copper chromite black spinel.

9. The laser platable thermoplastic composition of claim 7, wherein the copper salt is a copper hydroxide phosphate.

10. The laser platable thermoplastic composition of claim 1, wherein the composition further comprises a stabilizer selected from magnesium oxide, zinc sulfide, phosphite and combination thereof.

11. The laser platable thermoplastic composition of claim 1 wherein laser direct structuring synergist comprises a polysiloxane, a silane, a polysilane, or a combination thereof.

12. The laser platable thermoplastic composition of claim 1, wherein the composition comprises:
   from 50 wt. % to 90 wt. % of the polyarylene ether component;
   from 0.01 wt. % to 20 wt. % of the laser direct structuring additive;
   from 0.01 wt. % to 15 wt. % of the flame retardant; and
   from 0.01 wt. % to 20 wt. % of the impact modifier.

13. The laser platable thermoplastic composition of claim 12, wherein the impact modifier is present in an amount of from 5 wt. % to 15 wt. % relative to the total weight of the composition.

* * * * *